Feb. 19, 1935.   R. E. ZINN   1,991,916
METHOD AND APPARATUS FOR OXIDIZING PHOSPHORUS
Filed Jan. 16, 1932
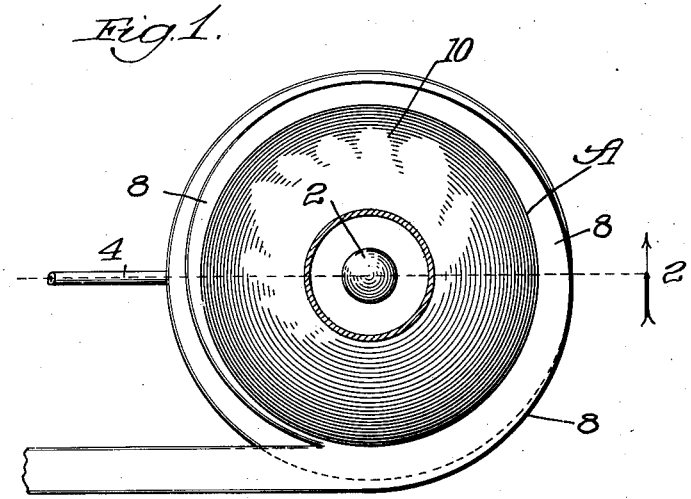
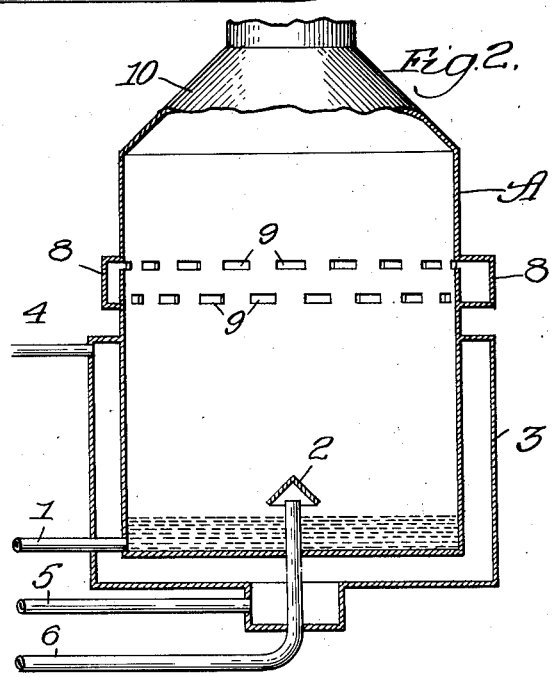
Inventor:
Robert E. Zinn,
By Dyrenforth, Lee, Chritton & Wiles
Attys.

Patented Feb. 19, 1935

1,991,916

UNITED STATES PATENT OFFICE 1,991,916

METHOD AND APPARATUS FOR OXIDIZING PHOSPHORUS

Robert E. Zinn, Chicago Heights, Ill., assignor to Victor Chemical Works, a corporation of Illinois Application January 16, 1932, Serial No. 587,121

12 Claims. (Cl. 23—165)

This invention relates to the production of substantially pure phosphorus pentoxide from phosphorus and an apparatus for carrying out such process.

It is well known that liquid or gaseous phosphorus will unite with oxygen of the air to form oxides of phosphorus, and more particularly phosphorus pentoxide, $P_2O_5$ or $P_4O_{10}$. There are, however, intermediate oxides such as $P_2O_3$ and $P_2O_4$, which may be formed during oxidation, as well as red phosphorus and some yellow phosphorus spray. Incomplete combustion is apparently due not only to lack of sufficient oxygen but to the extreme rapidity of the reaction, which may exhaust a local supply of oxygen, although in bulk the oxygen is present in excess. Oxidation of the red phosphorus and the $P_2O_3$ and $P_2O_4$ is much more difficult since these products are relatively stable and once formed are difficult to eliminate completely. Wherever it is desired to eliminate the lower oxides and red phosphorus completely, it is therefore essential to control the oxidation very carefully.

In accordance with this invention it is possible to control the ratio of oxygen to phosphorus with comparative ease, and this may be done from both sides of the reaction. That is, not only may the amount of oxygen be controlled with exactness, but the amount of phosphorus present may likewise be determined with accuracy.

The invention in a preferred embodiment is illustrated in the drawing, in which—

Fig. 1 represents a horizontal plan view of the burner, and Fig. 2 represents a vertical section on the line 2, in Fig. 1.

In carrying out the invention, phosphorus may be introduced into the burner A, preferably in liquid form, through the inlet 1, at a desired temperature, say, 50° C. The burner may be filled to a desired level below the nozzle 2, which is preferably directed downward and outward. The lower portion of the burner is preferably equipped with a temperature controlling means such as a jacket 3 about the lower portion of the casing 10 of said burner, in which a cooling fluid such as water, oil, air or the like may be circulated, entering through the pipe 4 and leaving through the pipe 5. Oxygen, preferably as air, may be introduced into the burner through appropriate openings, for example by the inlet 6 and the nozzle 2, in pre-determined quantities, and preferably at high velocity. Upon leaving the nozzle the oxygen or air is thoroughly admixed with the phosphorus vapors from the liquid phosphorus layer 7. Combustion takes place, and the mixture of vapors and reaction products rises in the burner until they reach the level of the annular scroll 8 having a plurality of openings 9. The amount of air introduced through the nozzle 2 is preferably controlled with reference to the amount of phosphorus vapor in such manner that combustion is not complete, and preferably so that combustion is less than half complete and preferably around ⅓.

Secondary oxygen is introduced to the vapors through appropriate means, preferably through the scroll 8 and the openings 9, at high velocity and in an amount somewhat in excess of that theoretically necessary for complete combustion. The speed of the air or oxygen may be varied, and its vortex action further controlled by adjustment of the angle of its entry into the burner through the openings 9; the more nearly tangential the angle, the greater being the vortex action for given velocities. In this manner a thorough admixture of the air and the vapors is accomplished. The vapors leave the burner through the outlet 10. The secondary air or oxygen inlet ports may also be tangential or radial nozzles or both. Such nozzles may be employed at any angle within the tangent in either direction, so that the angular velocity of the air vortex may be increased, partially disturbed, or actually impeded.

I have discovered that in the apparatus shown, the amount of phosphorus vapors present may be determined accurately by controlling the temperature of the liquid phosphorus, and consequently the vapor pressure and rate of vaporization thereof. In this manner it is possible to control the reaction even though the air supply may be somewhat variant in its nature, or more generally it is possible to keep the reaction balanced with great exactitude because of the fact that it is possible to control the phosphorus. The temperature of the liquid phosphorus may be easily controlled by means of the cooling jacket 3.

Control of the combustion may likewise be secured in some degree, by means of the amount of primary air introduced, the amount of phosphorus vapors removed to the secondary combustion zone depending in part upon this factor. The apparatus may be operated without the use of primary air, the evolution of vapors being controlled by the temperature of the liquid phosphorus and the secondary air. In the type of apparatus shown, a thoroughly complete oxidation of the phosphorus is readily procured, without the production of intermediate oxides or red phosphorus. The velocity of air from the nozzle 2 is preferably kept low enough so that no liquid phosphorus is sprayed from the surface of the liquid body, and therefore no liquid phosphorus is present in the vapors to contaminate the final product.

The foregoing detailed description has been given for clearness of understanding only, and no unnecessary limitations should be understood therefrom, but the appended claims should be construed as broadly as permissible, in view of the prior art.

I claim:

1. The method of completely oxidizing phosphorus which comprises liquefying phosphorus, introducing said phosphorus while still liquid into a confined zone, continuously vaporizing said phosphorus, thoroughly admixing with the vapors therefrom air in excess of that required for complete oxidation of said vapors, and controlling the proportion of phosphorus vapors to air by regulating the temperature of the liquid body of phosphorus.

2. The method as set forth in claim 1 in which the phosphorus is dry.

3. The method of completely oxidizing phosphorus which comprises: liquefying phosphorus, introducing said phosphorus while still liquid into a confined zone, controlling vaporization of the phosphorus by maintaining the phosphorus at a desired vaporizing temperature, thoroughly admixing with the vapors therefrom a primary supply of air insufficient to completely oxidize said vapors, removing said vapors from the vaporizing zone, and thoroughly admixing therewith a secondary supply of air in excess of that required to completely oxidize said vapors.

4. A method as set forth in claim 3, in which the primary supply of air is less than half of that required to completely oxidize said vapors.

5. A method as set forth in claim 3, in which the temperature of the phosphorus is controlled by means of a circulating fluid about said phosphorus.

6. A method as set forth in claim 3, in which the primary air is introduced close to the surface of the liquid phosphorus.

7. A method as set forth in claim 3, in which the secondary air is introduced in such manner as to produce a vortex movement.

8. The method of completely oxidizing phosphorus which comprises: maintaining a body of phosphorus in liquid form, controlling the vaporization from said body, admixing with the vapors therefrom a primary supply of air at a point close to the surface of said liquid body insufficient to completely oxidize said vapors, removing said mixture from the vaporizing zone and thoroughly admixing therewith a secondary supply of air in excess of that required to completely oxidize said vapors.

9. The method of completely oxidizing phosphorus which comprises: liquefying phosphorus, introducing said phosphorus while still liquid into a confined zone, controlling vaporization of the phosphorus by maintaining the phosphorus at a desired vaporization temperature below boiling, thoroughly admixing with the vapors therefrom a primary supply of air insufficient to completely oxidize said vapors, removing said vapors from the vaporizing zone, and thoroughly admixing therewith a secondary supply of air in excess of that required to completely oxidize said vapors.

10. The method of completely oxidizing phosphorus which comprises: liquefying phosphorus, introducing said phosphorus while still liquid into a confined zone, controlling vaporization of the phosphorus by maintaining the phosphorus at a desired vaporizing temperature, thoroughly admixing with the vapors therefrom a primary supply of air insufficient to completely oxidize said vapors, removing said vapors from the vaporizing zone, and thoroughly admixing therewith a secondary supply of air in excess of that required to completely oxidize said vapors, said secondary air supply being introduced at a point within the range of the combustion heat from said primary supply of air.

11. A phosphorus burner comprising a casing, means for maintaining a liquid body within said casing, means for cooling said liquid body during combustion of vapors evolved therefrom, said cooling means being likewise adapted to control the temperature of and vaporization from said body, means for supplying primary gas close to the surface of said liquid body, said primary means comprising a downwardly directed nozzle immediately above the surface of said liquid body, and means for supplying secondary gas beyond said primary means.

12. Apparatus as set forth in claim 11 in which said secondary means comprises an annular scroll about an upper portion of said casing provided with a plurality of openings through the casing.

ROBERT E. ZINN.